United States Patent
Babazadeh et al.

(10) Patent No.: US 10,523,102 B1
(45) Date of Patent: Dec. 31, 2019

(54) METHODS AND APPARATUSES FOR STABLE CONTROL IN POWER CONVERTERS

(71) Applicant: Alpha and Omega Semiconductor (Cayman) Limited, Grand Cayman (KY)

(72) Inventors: Amir Babazadeh, Laguna Hills, CA (US); Chris M. Young, Round Rock, TX (US)

(73) Assignee: Alpha and Omega Semiconductor (Cayman) Limited, Grand Cayman (KY)

( * ) Notice: Subject to any disclaimer, the term of this patent is extended or adjusted under 35 U.S.C. 154(b) by 0 days.

(21) Appl. No.: 16/245,041

(22) Filed: Jan. 10, 2019

(51) Int. Cl.
*H02M 3/157* (2006.01)
*H02M 1/00* (2006.01)
*H02M 3/04* (2006.01)

(52) U.S. Cl.
CPC ............ *H02M 1/00* (2013.01); *H02M 3/04* (2013.01); *H02M 3/157* (2013.01); *H02M 2001/0012* (2013.01); *H02M 2001/0025* (2013.01)

(58) Field of Classification Search
CPC . H02M 2001/0012; H02M 2001/0025; H02M 3/157
See application file for complete search history.

(56) References Cited

U.S. PATENT DOCUMENTS

| | | | |
|---|---|---|---|
| 5,929,692 A | 7/1999 | Carsten | |
| 6,518,849 B1* | 2/2003 | Delano | H03F 3/2171 330/10 |
| 6,522,108 B2 | 2/2003 | Prager et al. | |
| 8,575,910 B2 | 11/2013 | Young | |
| 2008/0129264 A1* | 6/2008 | Moussaoui | H02M 3/156 323/283 |
| 2011/0109290 A1* | 5/2011 | Tang | H02M 3/156 323/282 |
| 2011/0175584 A1* | 7/2011 | Huber | H02M 3/156 323/282 |
| 2014/0125306 A1 | 5/2014 | Babazadeh et al. | |
| 2014/0333270 A1* | 11/2014 | Young | G05F 1/12 323/234 |

* cited by examiner

*Primary Examiner* — Harry R Behm
(74) *Attorney, Agent, or Firm* — Craige Thompson; Thompson Patent Law (57) ABSTRACT

Apparatus and associated methods relate to modulating the frequency of a switch signal to achieve a fast transient response while holding the average frequency constant over a predetermined number of N cycles. In an illustrative example, a quantum charge modulator may include a compensation processor configured to compensate an error signal and generate a compensation signal by performing operations to maintain an average switching frequency over the N cycles in response to the transient. The compensation signal may be a function of a real phase deviation $\Delta T_{SW}$ between a stable pulse modulated signal having a cycle period $T_{SW}$ before the transient and a measured pulse modulated signal having a cycle period $T_{SW\_M}$ after the transient. A forgetting factor may be used to calculate the phase deviations. The quantum charge modulator may provide a compensation free, stable, and high performance response over power stage component changes.

20 Claims, 6 Drawing Sheets

METHODS AND APPARATUSES FOR STABLE CONTROL IN POWER CONVERTERS

TECHNICAL FIELD

Various embodiments relate generally to power converters.

BACKGROUND

Electronic devices receive power in a variety of ways. For example, consumer electronic devices may receive power from a wall outlet (e.g., mains) or from various portable sources (e.g., batteries, renewable energy sources, generators). Battery operated devices have an operational time that is dependent upon battery capacity and average current draw. Manufacturers of battery powered devices may strive to reduce average battery current of their products in order to offer longer device use between battery replacement or between charge operations. In some examples, manufacturers of mains powered devices may strive to increase power efficiency of their products in order to minimize thermal loads and/or to maximize the performance per watt of power consumed.

In some electronic devices, an input voltage supply (e.g., battery input, rectified mains supply, intermediate DC supply) may be converted to a different voltage by various voltage conversion circuits. Switch-mode power supplies have gained popularity as voltage conversion circuits due to their high efficiency and therefore are often used in various electronic devices.

Switch-mode power supplies convert voltages using switching devices that turn on with very low resistance and turn off with very high resistance. Switch-mode power supplies may charge an output inductor during a period of time and may release part or all of the inductor energy during a subsequent period of time. The output energy may be delivered to a bank of output capacitors, which provide the filtering to produce a DC output voltage. In buck-derived switch-mode power supplies, the output voltage, in a steady state, may be approximately the input voltage times a duty cycle, where the duty cycle is the duration of the on-time of a pass switch divided by the total on-time and off-time of the pass switch for one switching cycle.

SUMMARY

Apparatus and associated methods relate to modulating the frequency of a switch signal to achieve a fast transient response while holding the average frequency constant over a predetermined number of N cycles. In an illustrative example, a quantum charge modulator may include a compensation processor configured to compensate an error signal and generate a compensation signal by performing operations to maintain an average switching frequency over the N cycles in response to the transient. The compensation signal may be a function of a real phase deviation $\Delta T_{SW}$ between a stable pulse modulated signal having a cycle period $T_{SW}$ before the transient and a measured pulse modulated signal having a cycle period $T_{SW\_M}$ after the transient. A forgetting factor may be used to calculate the phase deviations. The quantum charge modulator may provide a compensation free, stable, and high performance response over power stage component changes.

Various embodiments may achieve one or more advantages. For example, a quantum charge modulator may provide a power converter with a stable and robust performance over a wide range of operation. The quantum charge modulator may provide the power converter with a fast transient response to reject load disturbances, for example, over the power stage component changes made by a user or unintentional changes due to aging and temperature change. Some embodiments may provide a simple and cost-effective power supply by applying a forgetting factor when calculating and compensating an error, such as errors in output voltage of a digital feedback system (e.g., a switch-mode power supply). The error compensation path circuit having an error calculation circuit and an error compensator may make the power converter easy to use and simple to tune. In some embodiments, the forgetting factor may advantageously speedup the transient correction. In some embodiments, the quantum charge modulator may also minimize overshoot, undershoot, and/or ringing in response to load transients (e.g., step changes) in load current. Some embodiments may provide a low-cost and easy-to-design power supply with quantum charge modulation by reducing the area and power consumption on the chip. In some embodiments, the power supply with a quantum charge modulator may have a higher control loop bandwidth. In some embodiments, a power controller feedback system may have a fast enough respond to transients and at the same time be stable (e.g., without oscillations) by using the quantum charge modulation method. Therefore, the design and compensation process may be advantageously simplified.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, a power converter compensated with an exemplary quantum charge modulator configured to dynamically compensate in response to output transients is briefly introduced with reference to FIG. 1. Second, with reference to FIGS. 2-4B, the discussion turns to exemplary embodiments that illustrate the structure of the quantum charge modulator and the definition of the deviations between an ideal switching pulse and a real switching pulse. With reference to FIGS. 5A-5B, further explanatory discussion and experimental data is presented to explain improvement in transient response by implementing the quantum charge modulator. Finally, with reference to FIG. 6, further explanatory discussion is presented to explain the method to calculate deviations between a real switching pulse and an ideal switching pulse.

Figure 1:
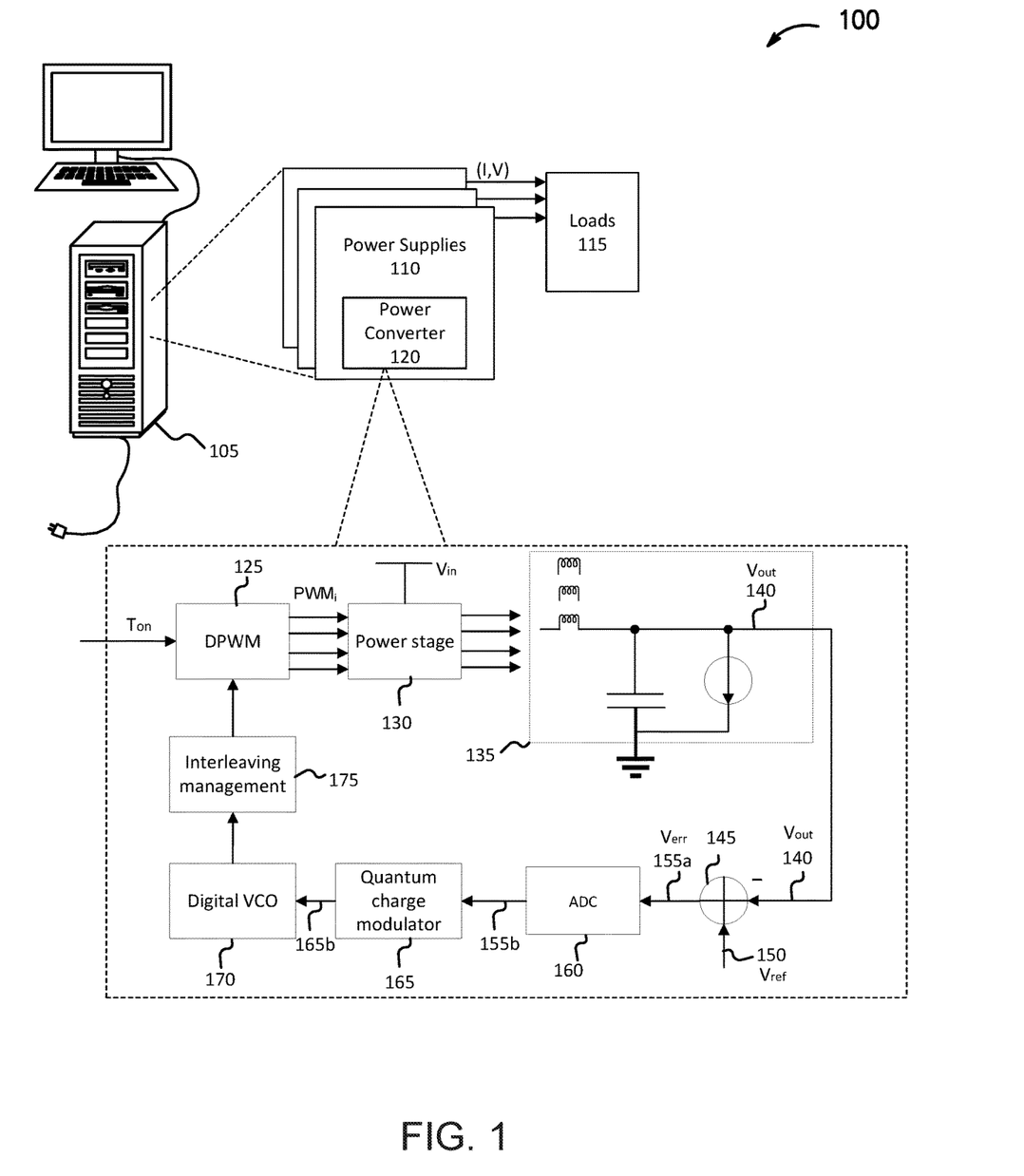
FIG. 1 depicts a power converter compensated with an exemplary quantum charge modulator configured to dynamically compensate in response to output transients.

FIG. 1 depicts a power converter compensated with an exemplary quantum charge modulator configured to dynamically compensate in response to output transients. In this depicted example, a system 100 includes a powered load system 105. The powered load system 105 includes one or more interleaved power supplies 110 implemented in the computer 105 supplying one or more loads 115. In some examples, the loads 115 may be specified to operate at an input voltage with limited voltage perturbations. The power supplies 110 include a power converter 120. The power converter 120 regulates currents or voltages supplied into the loads 115. The power converter 120 is configured to dynamically modulate the frequency of a switch signal to achieve a fast transient response while holding the average frequency constant over a predetermined number of N cycles.

More specifically, the power converter 120 includes a digital pulse width modulator (DPWM) 125 controlling the input to associated power switches and reducing output capacitance. In an illustrative example, the DPWM 125 may receive a constant on time signal Ton and generate one or more pulse-modulated signals (e.g., PWM1, PWM2, PWM3) with commanded duty ratio at the frequency of $f_{sw}$. The power converter 120 also includes a power stage 130 connected with the DPWM 125 in series. The power stage 130 receives one or more clock signals from the DPWM 125. In some embodiments, the power stage 130 may include many power switches. The power stages provide power to a load circuit 135. The load circuit has an output voltage signal ($V_{out}$) 140.

The power converter 120 also includes a subtraction junction 145. The subtraction junction 145 receives the output voltage signal ($V_{out}$) 140 and a reference voltage signal 150. The subtraction junction 145 subtracts the output voltage signal 140 from the reference voltage signal 150 and generates an error voltage signal ($V_{err}$) 155a. In some embodiments, the reference voltage signal 150 may be constant. In some embodiments, the reference voltage signal 150 may be adjusted. The error voltage signal ($V_{err}$) 155a is received by an analog-to-digital converter (ADC) 160. The ADC 160 converts the error voltage signal ($V_{err}$) 155a into a digital error voltage signal 155b and sends the digital error voltage signal into a quantum charge modulator (QCM) 165. The QCM 165 generates a control signal 165b to control the DPWM 125 in response to a load transient. In various embodiments, the QCM 165 may modulate the compensation signal output from a conventional linear time-invariable (LTI) (e.g., a proportional and integrator (PI), a proportional-integral-derivative (PID)) compensator module, for example, as a function of a difference between a measured period after the transient and a period during steady-state operation prior to the transient. By selectively applying a forgetting factor in certain predetermined operating conditions, the average frequency may be held constant over the predetermined N cycles of the power converter 120.

In this depicted example, the power converter 120 also includes an oscillator 170. As the power converter 120 is a digitally controlled power converter, the oscillator 170 may be a digital voltage-controlled oscillator (VCO). The VCO 170 may function as a counter in a constant on time (COT) control. The VCO 170 receives the compensated signal from the QCM 165 and modulates the frequency of the pulse-width modulated signal. In this depicted example, the VCO uses a digital counter with a clock rate $F_{clk}$.

In this depicted example, the power converter 120 also includes an interleaving management block 175. The interleaving management block 175 manages and splits frequency of the pulse-width modulated signal. For example, the interleaving management block 175 specifies a first pulse to a first phase and specifies a second pulse to a second phase. The interleaving management 175 sends the split frequency to the DPWM 125.

The quantum charge modulator 165, the digital VCO 170, and the interleaving management 175 may be operated, for example, as a constant on time control. In some embodiments, the quantum charge modulator 165 may be applied on systems operating at variable switching frequencies. In some embodiments, the quantum charge modulator 165 may be applied to further enhance transient response for systems operating under constant frequency control. In some embodiments, the powered load system 105 may include, by way of example and not limitation, a server, closed-loop-speed-controlled motors.

Figure 2:
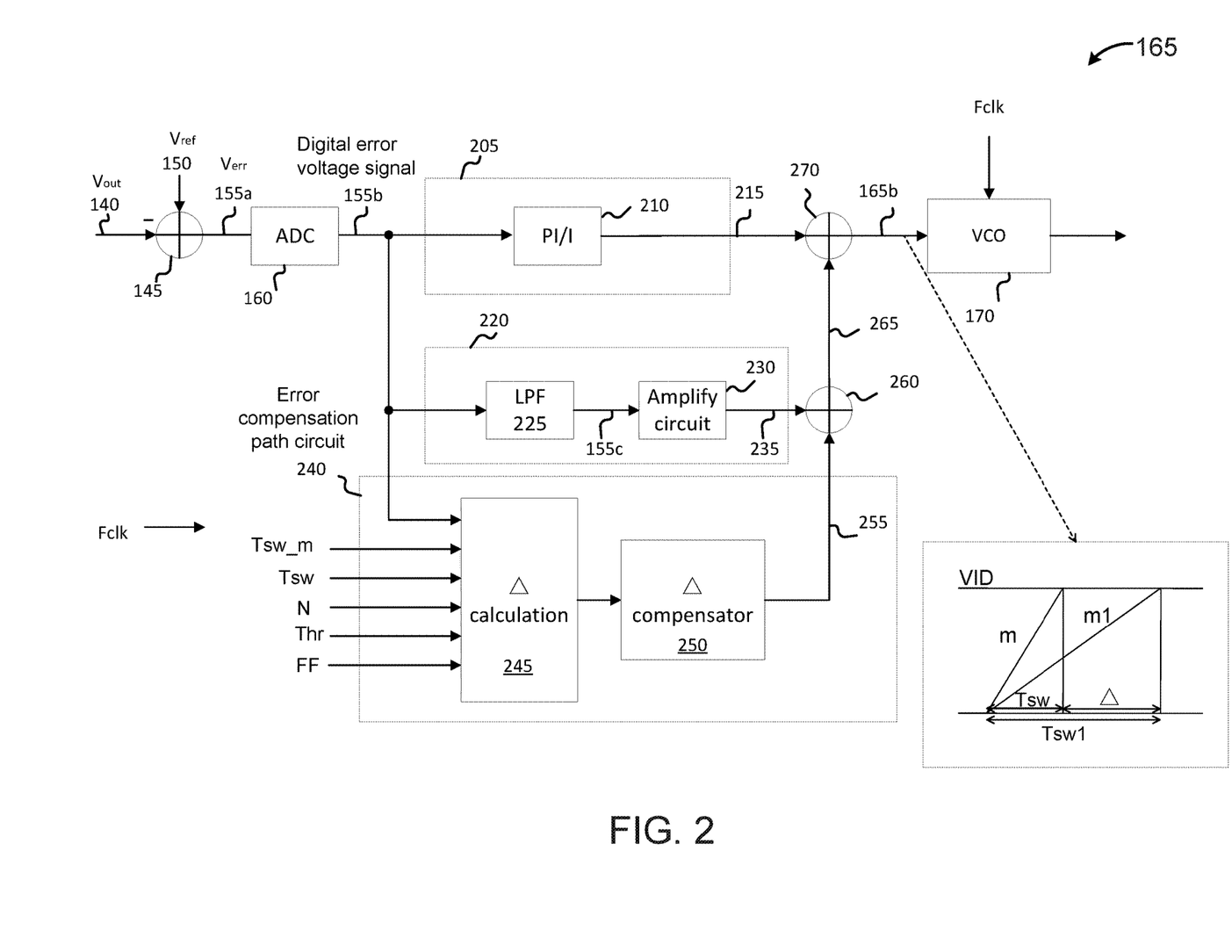
FIG. 2 depicts the exemplary quantum charge modulator in the power converter.

FIG. 2 depicts an exemplary quantum charge modulator in the power converter. In this depicted example, the quantum charge modulator 165 includes a slow path circuit 205. The slow path circuit 205 includes a feedback error compensator 210. In some embodiments, the feedback error compensator may include a proportional and integrator (PI) response. The feedback error compensator 210 receives the digital error voltage signal 155b from the ADC 160. In this depicted example, the feedback error compensator 210 may have, for example, an integrating gain to drive steady state feedback error toward zero in response to a transient. The feedback error compensator 210 generates a first compensation signal 215.

The quantum charge modulator 165 also includes a fast gain path circuit 220. While the slow path circuit 205 ensures that the output is regulated to the DC setpoint over time, the fast path circuit 220 ensures that the output is regulated to the DC setpoint for fast transients. The fast gain path circuit 220 receives the digital error voltage signal 155b from the ADC 160. In this depicted example, the fast gain path circuit 220 includes a low-pass filter (LPF) 225. The low-pass filter 225 is used to remove noise from the digital error voltage signal 155b. The fast gain path circuit 220 also includes an amplifying circuit 230. The amplifying circuit 230 amplifies the noise removed digital error voltage signal 155c with a gain and generates an amplified error signal 235. An example of the amplifying circuit in the fast gain path circuit 220 is described in further detail with reference to FIG. 3.

The quantum charge modulator 165 also includes an error compensation path circuit 240. The error compensation path circuit 240 includes an error calculation circuit 245. The error calculation circuit 245 receives the digital error voltage signal 155b, a real switching signal $T_{SW\_M}$ after a transient (e.g., load transient), an ideal switching signal $T_{SW}$ (e.g., in a steady state) before the transient, and a number of phases N. The digital error voltage signal 155b is a measure of deviation of the output voltage signal 140 relative to the reference voltage signal 150 (e.g., DC setpoint). In some embodiments, the error calculation circuit 245 may be designed to have a first predetermined calculation threshold Thr. The error calculation circuit 245 may only calculate the error when the error is larger than the calculation threshold.

In some embodiments, the error calculation circuit 245 may also be designed to receive a forgetting factor FF. The forgetting factor FF may be a predetermined user-defined value (e.g., 60%). The forgetting factor may advantageously speedup the compensation by ignoring some part of the error. In some embodiments, the forgetting factor may be adaptively adjusted based on the error. An example of calculating an error is described in further detail with reference to FIG. 4A and FIG. 4B. An example of calculating an error by using a forgetting factor is described in further detail with reference to FIG. 6.

The error compensation path circuit 240 also includes an error compensator 250. The error compensator 250 generates a sub-compensation signal 255 with a modulated slope to change the frequency of the switching signal to compensate the calculated error.

The quantum charge modulator 165 also includes a first summing junction 260. The first summing junction 260 receives the amplified error signal 235 and the sub-compensation signal 255 and outputs a second compensation signal 265. The quantum charge modulator 165 also includes a second summing junction 270. The second summing junction 270 receives the first compensation signal 215 and the second compensation signal 265 to output the control signal 165b. In some embodiments, the first summing junction 260 and the second summing junction 270 may be combined. The control signal 165b is received by the VCO 170. For example, the control signal 165b may be modulated to have a second slope m1 that is different from a first slope m of the steady state signal. The frequency of the switching signal is then modulated. In steady state, the amplified error signal 235 and the sub-compensation signal 255 are both 0. The control signal 165b that is generated by the second summing junction 270 is equal to the first compensation signal 215 (e.g., $(-V_{ID}/T_{sw}*N_{ph})$). When the transition happens, if the error compensation path circuit 240 is not activated, the first compensation signal 215 and the amplified error signal 235 will create a control signal (e.g., the control signal 165b) that equals $(-V_{ID}/T_{sw\_m}*N_{ph})$. If the error compensation path circuit 240 is activated, the error compensation path circuit 240 modulates the control signal 165b by adding the sub-compensation signal 255. The sub-compensation signal 255 may be $(-V_{ID}/T_{sw\_m}*N_{ph}+V_{ID}/(T_{sw\_m}+\Delta)*N_{ph})$ and the sum of the first compensation signal 215 and the amplified error signal 235 may be $V_{ID}/T_{sw\_m}*N_{ph}$.

Figure 3:
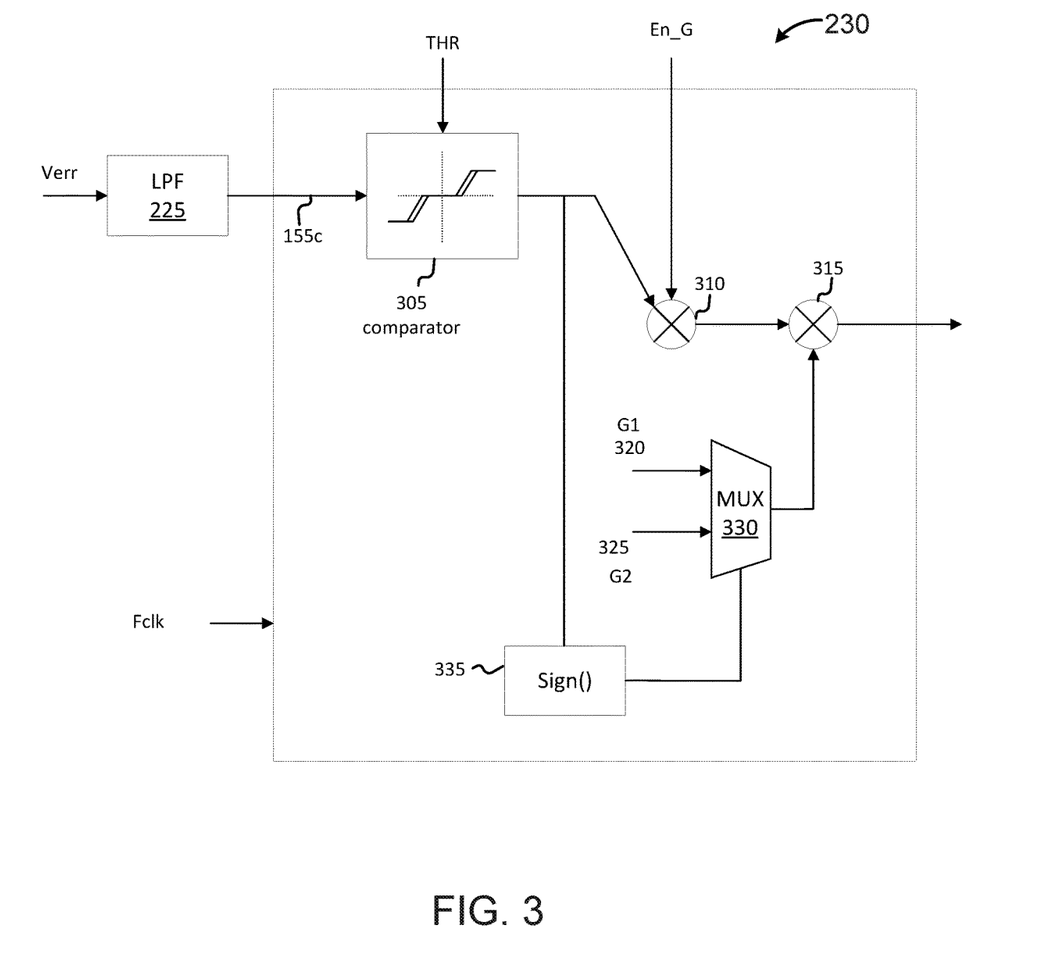
FIG. 3 depicts an exemplary amplifying circuit in the quantum charge modulator.

FIG. 3 depicts an exemplary amplifying circuit in the quantum charge modulator. The amplifying circuit 230 includes a comparator 305. The comparator 305 receives the noise removed digital error voltage signal 155c from the LPF 225. The comparator 305 compares the noise removed digital error voltage signal 155c with a second predetermined threshold. In some embodiments, the second predetermined threshold may be equal to the first predetermined threshold Thr of the error calculation circuit 245. In some embodiments, the second predetermined threshold may be different from the first predetermined threshold Thr of the error calculation circuit 245. The amplifying circuit 230 amplifies the noise removed digital error voltage signal 155c only when the absolute value of the error is larger than the threshold. In some embodiments, the threshold may include a predetermined positive threshold and a predetermined negative threshold. When the error is positive, the comparator 305 may compare the error with a positive threshold. When the error is negative, the comparator 305 may compare the error with the negative threshold. In some embodiments, the positive threshold and the negative threshold may have different absolute values.

The amplifying circuit 230 also includes an enable block 310. The enable block 310 may be controlled to enable or disable the amplifying circuit 230 in response to a user command signal En_G. In this depicted example, the enable block 310 is an enable amplifier. The user command signal En_G includes 0 or 1. When the user wants to enable the amplifying circuit 230, the user may input 1 to the enable block 310. When the user wants to disable the amplifying circuit 230, the user may input 0 to the enable block 310. The noise removed digital error voltage signal 155c is amplified by 0 or 1. In some embodiments, the user may disable the fast gain path circuit 220 when a standard compensation approach may be needed in some instances. For example, troubleshooting and/or system characterization. In this depicted example, the enable block 310 is arranged between the comparator 305 and a gain amplifier 315. The gain amplifier 315 amplifies the error with a gain. In some embodiments, the gain amplifier 315 may have different gains to amplify different error values. In this depicted example, the gain amplifier 315 may have a first gain value 320 and a second gain value 325. The first gain value 320 and the second gain value 325 are received by a two-input multiplexer 330. The multiplexer 330 selects a gain value to be applied on the gain amplifier 315. The selection is controlled by the sign of the error. In this depicted example, the amplifying circuit 230 also includes a sign block 335. The sign block connects with the comparator 305 to identify the sign of the error. When the error is positive, the sign block 335 may control the multiplexer 330 to select the first gain value 320. When the error is negative, the sign block may control the multiplexer to select the second gain value 325. The gain amplifier 315 amplifies the error with the selected gain value and generates the amplified error signal 235. In some embodiments, the first gain value 320 may be different from the second gain value 325.

Figure 4A:
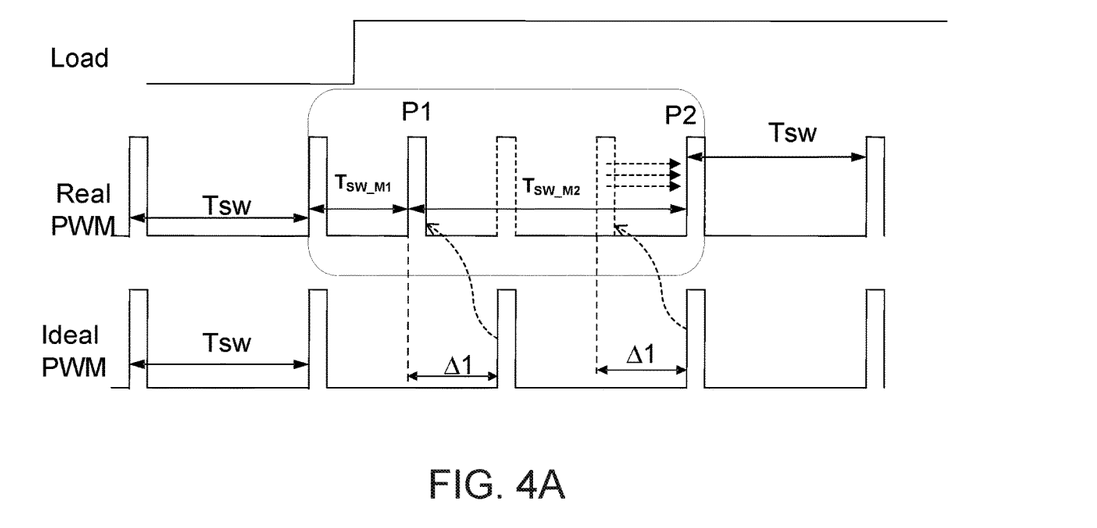
FIG. 4A depicts an exemplary behavior of a switching pulse in response to a load change in one cycle.
Figure 5A:
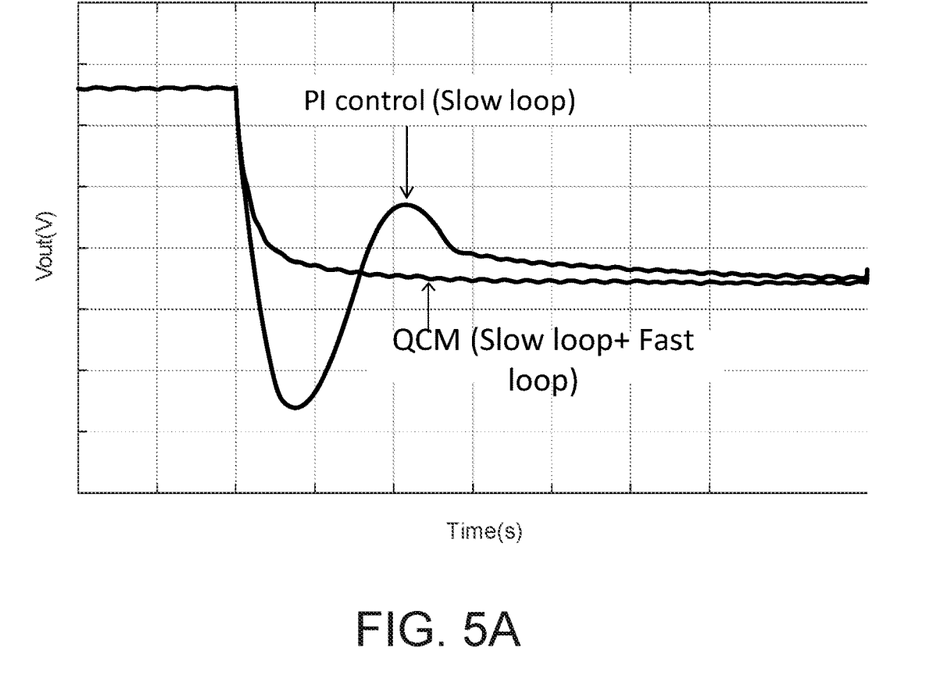
FIG. 5A depicts an exemplary simulation result of voltage recovery time in response to a step-up load transient.
Figure 5B:
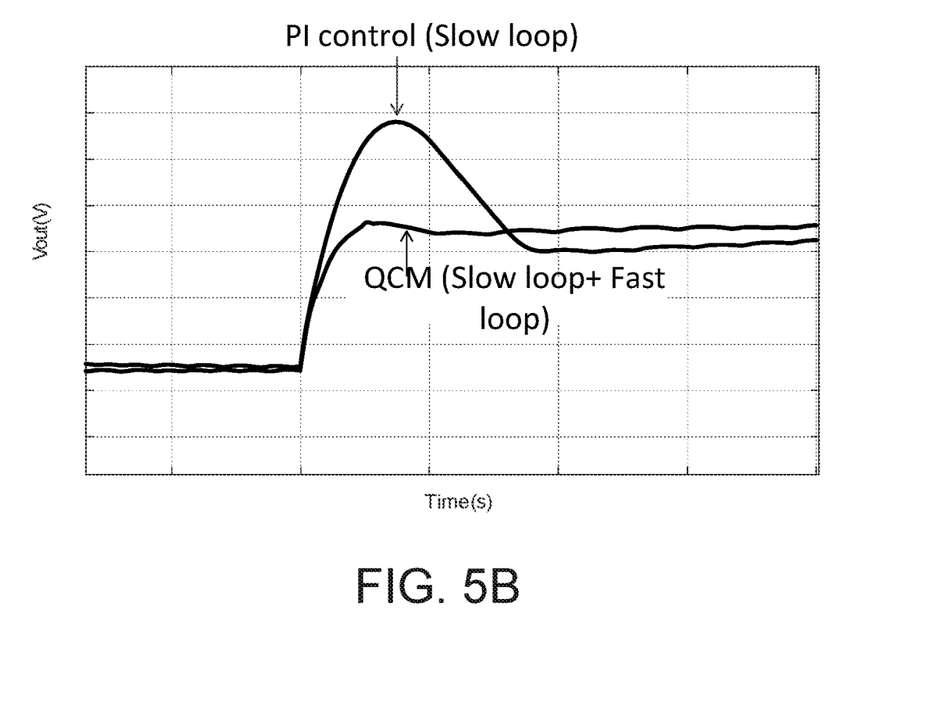
FIG. 5B depicts an exemplary simulation result of voltage recovery time in response to a step-down load transient.

FIG. 4A depicts an exemplary behavior of a switching pulse in response to a load change in one cycle. In this depicted example, an ideal pulse-width modulated signal Ideal_PWM changes its pulse frequency when there is a load transient. The Ideal_PWM signal has a steady pulse period $T_{SW}$. A real power switch signal PWM has the same phase and frequency relationship as the Ideal_PWM. When the load increases, more power needs to be supplied to the load. The real power switch signal PWM may increase its frequency when the error compensator 250 sees the error. For example, a first pulse $P_1$ of the Ideal_PWM signal may be moved to the left side to have a first period $T_{SW\_M1}$. For example, the first pulse $P_1$ is moved to have a positive first deviation $\Delta_1$ from the ideal pulse-width modulated signal, $T_{SW}-T_{SW\_M1}=\Delta_1$. Supposing the power is enough after one cycle, the error compensator 250 then moves a second pulse P2 to compensate the first deviation $\Delta_1$. More specifically, the error compensator 250 moves the second pulse $P_2$ to the right with a negative first deviation $\Delta_1$ to have a second period $T_{SW\_M2}$ to keep the average stable. $T_{SW\_M2}=T_{SW}+\Delta_1$. The average pulse frequency is kept constant.

Figure 4B:
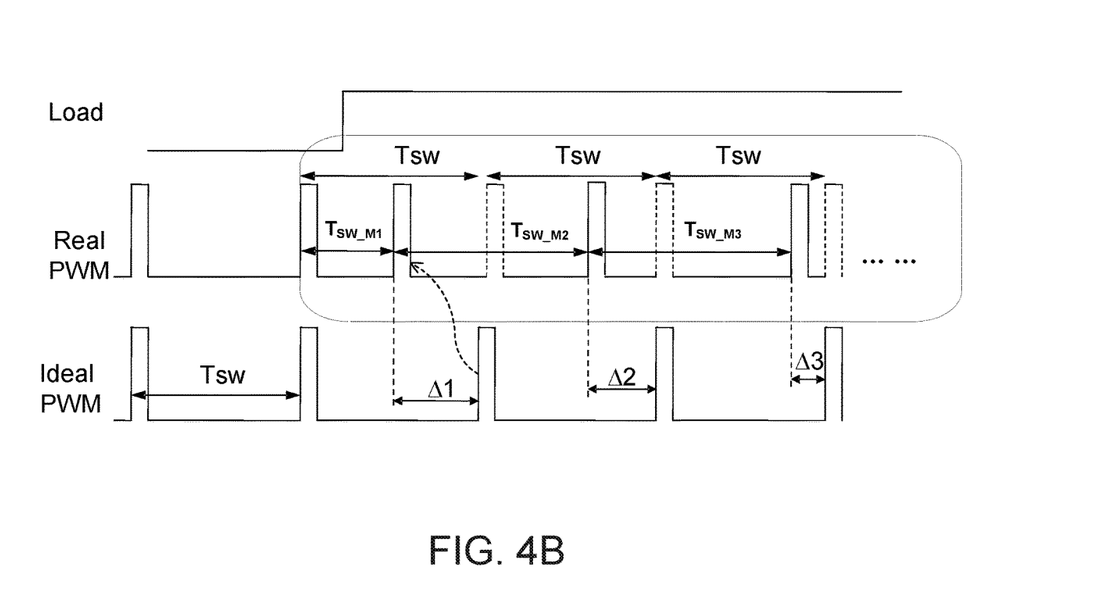
FIG. 4B depicts an exemplary behavior of a switching pulse in response to a load change in N cycles.

FIG. 4B depicts an exemplary behavior of a switching pulse in response to a load change in N cycles. In this depicted example, an ideal pulse-width modulated signal changes its pulse frequency when there is a large load transient. A single cycle is not enough for settling due to the large load transient. The ideal pulse-width modulated signal has a steady pulse period $T_{SW}$. When the load increases, more power needs to be supplied to the load. The ideal pulse-width modulated signal may increase its frequency when the compensation circuit sees the error. For example, the ideal pulse-width modulated signal may be moved to the left side with a first pulse $P_1$ having a first period $T_{SW\_M1}$. The first pulse $P_1$ is moved to have a first deviation $\Delta_1$ from the ideal pulse-width modulated signal. $\Delta_1=T_{SW}-T_{SW\_M1}$. Supposing the power supplied to the load is still not enough, the compensation circuit then moves a second pulse $P_2$ to the left with a second pulse $P_2$ having a second period $T_{SW\_M2}$. The second pulse $P_2$ is moved to have a second deviation $\Delta_2$ from the ideal pulse-width modulated signal. $\Delta_2=2*T_{SW}-T_{SW\_M1}-T_{SW\_M2}=(T_{SW}-T_{SW\_M1})+(T_{SW}-T_{SW\_M2})=\Delta_1+(T_{SW}-T_{SW\_M2})$. Similarly, $\Delta_3=3*T_{SW}-T_{SW\_M1}-T_{SW\_M2}-T_{SW\_M3}=(T_{SW}-T_{SW\_M1})+(T_{SW}-T_{SW\_M2})+(T_{SW}-T_{SW\_M3})=\Delta_2+(T_{SW}-T_{SW\_M3})$. For the $i^{th}$ pulse $P_i$, $\Delta_i=\Delta_{i-1}+(T_{SW}-T_{SW\_Mi})$. $i$ is the $i^{th}$ switch modulated pulse after the transient, $i=1, 2, \ldots N$. In the N cycles, a total real phase deviation $\Delta T_{SW}=\Sigma\Delta_i$.

To make the system stable, the error compensator 250 needs to substantially make $_\Sigma T_{SW\_Mn}/N=T_{sw}$ or drive $\Delta_n=0$ to make the system stable in N cycles.

FIG. 5A depicts an exemplary simulation result of voltage recovery time in response to a step-up load transient. In response to a rapid rise (e.g., the load has a current step up 200A), a power-supply voltage will drop until a power-supply regulation feedback loop brings the voltage back up to a programmed value. In this simulation, by using only the slow path circuit 205, it takes substantially more time (with oscillatory ringing) for the voltage to approach settling to the programmed value than using both the slow path circuit 205 and fast gain path circuit 220. In this example, the power supply implemented with the QCM has substantially avoids overshoot, undershoot, and ringing.

FIG. 5B depicts an exemplary simulation result of voltage recovery time in response to a step-down load transient. In response to a rapid drop (e.g., the load has a current step down 200A), a power-supply voltage will rise until a power-supply regulation feedback loop brings the voltage back to a programmed value. In this simulation, by using only the slow path circuit 205, it takes substantially more time (with oscillatory ringing) for the voltage to approach settling to the programmed value than using both the slow path circuit 205 and fast gain path circuit 220. By using both the slow path circuit 205 and fast gain path circuit 220, the voltage settles in a shorter time.

The quantum charge modulator 165 may advantageously decrease the recovery time when there is a load transient. In this example, the power supply implemented with the QCM may substantially avoid overshoot, undershoot, and/or ringing.

Figure 6:
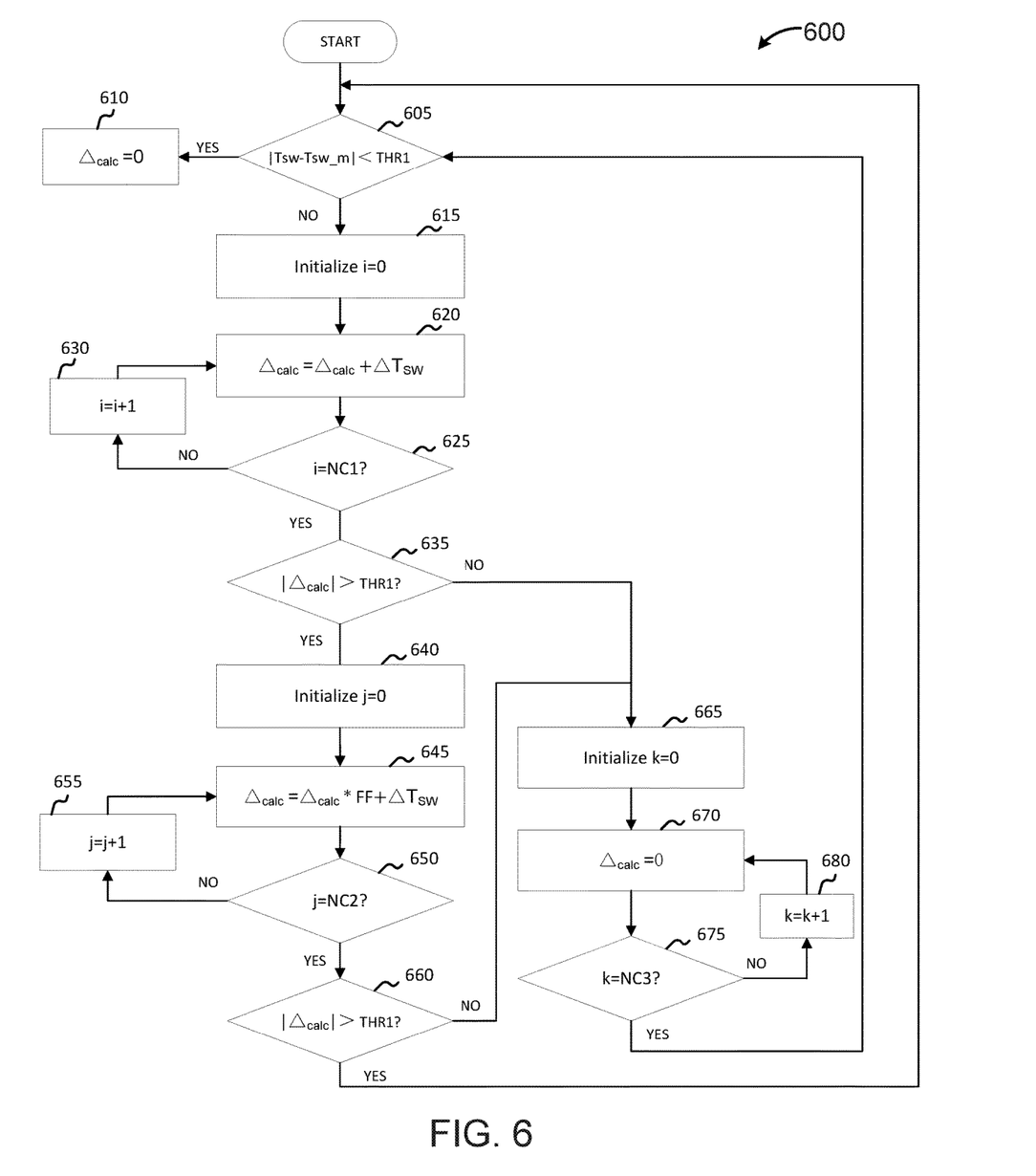
FIG. 6 depicts a flowchart of an exemplary method to calculate deviations between a real switching pulse and an ideal switching pulse.

FIG. 6 depicts a flowchart of an exemplary method to calculate deviations between a real switching pulse and an ideal switching pulse. A method 600 includes, at 605, a control logic deciding whether a total pulse deviation $\Delta T_{SW}$ (e.g., $|T_{sw}-T_{sw\_m}|$) is less than a user-predetermined first threshold THR1. The total pulse deviation $\Delta T_{SW}$ is the pulse deviations between the ideal switching signal $T_{SW}$ and the measured switching signal $T_{SW\_M}$ after the load transient.

If the $\Delta T_{SW}$ is less than the THR1, then at 610, the control logic calculates deviation $\Delta_{calc}=0$. If the $\Delta T_{SW}$ is not less than the THR1, then at 615, the control logic introduces a first variable i and initializes the variable i=0.

At 620, the control logic updates the $\Delta_{calc}=\Delta_{calc}+\Delta T_{SW}$. $\Delta T_{SW}=\Sigma\Delta_i$. $\Delta_i=\Delta_{i-1}+(T_{SW}-T_{SW\_Mi})$, i is the $i^{th}$ switch modulated pulse after the transient, $i=1, 2, \ldots N$. At 625, the control logic determines whether i is equal to a first user-defined number of cycles NC1. If i is not equal to NC1, then, at 630, the control logic increments i and loops back to 620.

If i is equal to NC1, then, at 635, the control logic determines whether the absolute value of $\Delta_{calc}$ is larger than the THR1. If the absolute value of $\Delta_{calc}$ is larger than the THR1, then, at 640, the control logic introduces a second variable j and initializes j=0. At 645, the control logic updates the $\Delta_{calc}$ by applying a forgetting factor FF (e.g., 20%), $\Delta_{calc}=\Delta_{calc}*FF+\Delta T_{SW}$.

At 650, the control logic determines whether the second variable j is equal to a second user-defined number of cycles NC2. If j is not equal to NC2, then, at 655, the control logic increments j and loops back to 645. If j is equal to NC2, then, at 660, the control logic determines whether the absolute value of $\Delta_{calc}$ is larger than the THR1.

If the absolute value of $\Delta_{calc}$ at 635 or after 660 is not larger than the THR1, then, at 665, the control logic introduces a third variable k and initializes k=0. At 670, the control logic updates the $\Delta_{calc}=0$. At 675, the control logic determines whether the third variable k is equal to a third user-defined number of cycles NC3. If the third variable k is not equal to NC3, then, at 680, the control logic increments the third variable k and loops back to 670. If the third variable k is equal to NC3, then, the control logic loops back to 605.

If the absolute value of $\Delta_{calc}$ after 660 is larger than the THR1, the control logic loops back to 605.

In some embodiments, the second predetermined number of cycles NC2 may include several sub cycles. Each sub cycle may employ a different FF. In some embodiments, the FF may be adaptively adjusted based on the deviation $\Delta T_{SW}$. A user may build a lookup table to show suggested values of FF with different deviations $\Delta T_{SW}$.

Although various embodiments have been described with reference to the figures, other embodiments are possible. For example, the quantum charge modulator and the corresponding method may be applied to any digital feedback system. PID control is widely used in industrial process control and the method may be applied in almost all of those applications. While the example is regulating the output voltage of a power supply, it may be applied, for example, to motor speed control to regulate a motor speed to one or more reference values. By way of example and not limitation, it may also be applied to digital feedback control systems, such as temperature control, torque control, mass or volume flow rate control. In some embodiments, the proposed control approach may be applied to systems operating at variable switching frequencies (e.g., constant on time) control. The proposed control approach may be applied on constant frequency control. For example, a user may select to enable or disable the use of the forgetting factor during the calculation. In some embodiments, when calculating with forgetting factor, the calculation may be divided into several stages. Each stage may employ a different forgetting factor. In some embodiments, a lookup table may be established that contains information relating to the relationship between a calculated error and a suggested forgetting factor. For example, a small forgetting factor may be selected when the error is big.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data.

In various embodiments, a computer system may include non-transitory memory. The memory may be connected to the one or more processors, which may be configured for storing data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits and/or other modules. In various examples, the modules may include analog and/or digital logic, discrete components, traces and/or memory circuits fabricated on a silicon substrate including various integrated circuits (e.g., FPGAs, ASICs). In some embodiments, the module(s) may involve execution of preprogrammed instructions and/or software executed by a processor. For example, various modules may involve both hardware and software.

In one exemplary aspect, an apparatus includes a feedback error compensator configured to generate a first compensation signal in response to an error signal associated with a controlled circuit parameter of a digital feedback system. The apparatus also includes a compensation processor configured to compensate the error signal and generate a second compensation signal by performing operations to maintain an average switching frequency over a predetermined N cycles in response to a transient. The second compensation signal is a function of a calculated phase deviation $\Delta_{calc}$ and the calculated phase deviation $\Delta_{calc}$ is a function of a real phase deviation $\Delta T_{SW}$ between a stable pulse modulated signal having a cycle period $T_{SW}$ before the transient and a measured pulse modulated signal having a cycle period $T_{SW\_M}$ after the transient. The apparatus also includes a combiner module configured to combine the first compensation signal and the second compensation signal to generate a control signal to be received by the digital feedback system. A period of the measured pulse modulated signal output by the digital feedback system is responsive to the generated control signal.

In some embodiments, the operations may include (a) determining the real phase deviation $\Delta T_{SW}$, (b) if the $\Delta T_{SW}$ is less than or equal to a predetermined threshold THR1, then updating the $\Delta_{calc}=0$, and (c) if the $\Delta T_{SW}$ is greater than the THR1, then for a first predetermined number of cycles NC1, updating the $\Delta_{calc}$ in each of the cycles by adding the $\Delta T_{SW}$.

In some embodiments, the operations may also include (d) if the $\Delta T_{SW}$ is greater than the THR1 after the first predetermined number of cycles NC1, then for a second predetermined number of cycles NC2, updating the $\Delta_{calc}$ in each of the cycles by multiplying a user-predetermined forgetting factor, and (e) if the $\Delta T_{SW}$ is less than or equal to THR1 after the NC1 cycles, then repeating operations (a)-(d) for the NC1 cycles.

In some embodiments, the second predetermined number of cycles NC2 may also include a plurality of sub cycles. In each sub cycle of the plurality of sub cycles, the compensation processor may be configured to update the $\Delta_{calc}$ to associate with a corresponding forgetting factor. In some embodiment, the phase deviation $\Delta T_{SW}=\Sigma\Delta_i$, $\Delta_i=\Delta_{i-1}+(T_{SW}-T_{SW\_Mi})$, i is the $i^{th}$ pulse of the measured pulse modulated signal after the transient, i=1, 2, ... N.

In some embodiments, the operations may also include (f) if the absolute value of $\Delta_{calc}$ is greater than the THR1 after the predetermined number of cycles NC2, then for a third predetermined number of cycles NC3, updating the $\Delta_{calc}=0$, and (g) if the absolute value of $\Delta_{calc}$ is less than or equal to THR1 after the NC2 cycles, then repeating operations (a)-(d) for the NC1 cycles.

In some embodiments, the compensation processor may include an error calculation circuit configured to calculate the $\Delta_{calc}$ in response to the error signal, the stable pulse modulated signal having a cycle period $T_{SW}$, and the measured pulse modulated signal having a cycle period $T_{SW\_M}$. In some embodiments, the error calculation circuit may also be configured to calculate the $\Delta_{calc}$ in response to a user-predetermined forgetting factor. The compensation processor may also include an error compensator configured to compensate the $\Delta_{calc}$. The compensation processor may also include a fast gain path circuit configured to receive the error signal and generate an amplified voltage error signal. The fast gain path circuit may include a low-pass filter configured to filter the error signal, and an amplifying circuit configured to amplify the filtered error signal. The amplifying circuit may also include a first selection circuit configured to enable or disable the fast gain path circuit. The amplifying circuit may also include an amplifier configured to amplify the filtered error signal with a first gain value when the voltage error signal is positive and amplify the voltage error signal with a second gain value when the voltage error signal is negative. The first gain value may be different from the second gain value.

In another exemplary aspect, a method of configuring a quantum charge modulator includes generating, by a feedback error compensator, a first compensation signal in response to an error signal associated with a controlled circuit parameter of a digital feedback system. The method also includes generating, by a compensation processor, a second compensation signal to compensate the error signal by performing operations to maintain an average switching frequency over a predetermined N cycles in response to a transient. The method also includes combining the first compensation signal and the second compensation signal to generate a control signal to be received by the digital feedback system. A period of the measured pulse modulated signal output by the digital feedback system is responsive to the generated control signal. The second compensation signal is a function of a calculated phase deviation $\Delta_{calc}$, and the calculated phase deviation $\Delta_{calc}$ is a function of a real phase deviation $\Delta T_{SW}$ between a stable pulse modulated signal having a cycle period $T_{SW}$ before the transient and a measured pulse modulated signal having a cycle period $T_{SW\_M}$ after the transient.

In some embodiments, performing operations may also include (a) determining the real phase deviation $\Delta T_{SW}$, (b) if the $\Delta T_{SW}$ is less than or equal to a predetermined threshold THR1, then updating the $\Delta_{calc}=0$, and (c) if the $\Delta T_{SW}$ is greater than the THR1, then for a first predetermined number of cycles NC1, updating the $\Delta_{calc}$ by adding the $\Delta T_{SW}$.

In some embodiments, performing operations may also include (d) if the $\Delta T_{SW}$ is greater than the THR1 after the first predetermined number of cycles NC1, then for a second predetermined number of cycles NC2, updating the $\Delta_{calc}$ by multiplying a user-predetermined forgetting factor, and (e) if the $\Delta T_{SW}$ is less than or equal to THR1 after the first predetermined number of cycles NC1, then repeating operations (a)-(d) for the NC1 cycles. In some embodiments, the second predetermined number of cycles NC2 may also include a plurality of sub cycles, in each sub cycle of the plurality of sub cycles, the Δcalc may be updated by the compensation processor to associate with a corresponding forgetting factor.

In some embodiments, performing operations may also include (f) if the absolute value of $\Delta_{calc}$ is greater than the THR1 after the cycles NC2, then for a third predetermined number of cycles NC3, updating the $\Delta_{calc}=0$, and (g) if the absolute value of $\Delta_{calc}$ is less than or equal to THR1 after the NC2 cycles, then repeating operations (a)-(d) for the NC1 cycles.

In some embodiments, the phase deviation $\Delta T_{SW}=\Sigma \Delta_i$, $\Delta_i=\Delta_{i-1}+(T_{SW}-T_{SW\_Mi})$, i is the $i^{th}$ pulse of the measured pulse modulated signal after the transient, i=1, 2, ... N. In some embodiments, the compensation processor may include an error calculation circuit configured to calculate the $\Delta_{calc}$ in response to the error signal, the stable pulse modulated signal having a cycle period $T_{SW}$, and the measured pulse modulated signal having a cycle period $T_{SW\_M}$. The error calculation circuit may be also configured to calculate the $\Delta_{calc}$ in response to a user-predetermined forgetting factor.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. An apparatus comprising:
   a feedback error compensator configured to generate a first compensation signal in response to an error signal associated with a controlled circuit parameter of a digital feedback system;
   a compensation processor configured to compensate the error signal and generate a second compensation signal by performing operations to maintain an average switching frequency over a predetermined number of N cycles in response to a transient, wherein the second compensation signal is a function of a calculated phase deviation $\Delta_{calc}$, the calculated phase deviation $\Delta_{calc}$ is a function of a real phase deviation $\Delta T_{SW}$ between a stable pulse modulated signal having a cycle period $T_{SW}$ before the transient and a measured pulse modulated signal having a cycle period $T_{SW\_M}$ after the transient; and,
   a combiner module configured to combine the first compensation signal and the second compensation signal to generate a control signal to be received by the digital feedback system, wherein a period of the measured pulse modulated signal output by the digital feedback system is responsive to the generated control signal.

2. The apparatus of claim 1, wherein the operations comprise:
   (a) determining the real phase deviation $\Delta T_{SW}$;
   (b) if the $\Delta T_{SW}$ is less than or equal to a predetermined threshold THR1, then updating the $\Delta_{calc}=0$; and,
   (c) if the $\Delta T_{SW}$ is greater than the THR1, then for a first predetermined number of cycles NC1, updating the $\Delta_{calc}$ in each of the cycles by adding the $\Delta T_{SW}$.

3. The apparatus of claim 2, wherein the operations further comprise:
   (d) if the $\Delta T_{SW}$ is greater than the THR1 after the first predetermined number of cycles NC1, then for a second predetermined number of cycles NC2, updating the $\Delta_{calc}$ in each of the cycles by multiplying a user-predetermined forgetting factor; and,
   (e) if the $\Delta T_{SW}$ is less than or equal to THR1 after the NC1 cycles, then repeating operations (a)-(d) for the NC 1 cycles.

4. The apparatus of claim 3, wherein, the second predetermined number of cycles NC2 further comprises a plurality of sub cycles, wherein in each sub cycle of the plurality of sub cycles, the compensation processor is configured to update the Δcalc to associate with a corresponding forgetting factor.

5. The apparatus of claim 3, wherein the operations further comprise:
   (f) if the absolute value of $\Delta_{calc}$ is greater than the THR1 after the predetermined number of cycles NC2, then for a third predetermined number of cycles NC3, updating the $\Delta_{calc}=0$; and,
   (g) if the absolute value of $\Delta_{calc}$ is less than or equal to THR1 after the NC2 cycles, then repeating operations (a)-(d) for the NC1 cycles.

6. The apparatus of claim 1, wherein the compensation processor further comprises:
   an error calculation circuit configured to calculate the $\Delta_{calc}$ in response to the error signal, the stable pulse modulated signal having a cycle period $T_{SW}$, and the measured pulse modulated signal having a cycle period $T_{SW\_M}$.

7. The apparatus of claim 6, wherein the error calculation circuit is further configured to calculate the Δcalc in response to a user-predetermined forgetting factor.

8. The apparatus of claim 1, wherein the phase deviation $\Delta T_{SW}=\Sigma \Delta_i$, $\Delta_i=\Delta_{i-1}+(T_{SW}-T_{SW\_Mi})$, i is the $i^{th}$ pulse of the measured pulse modulated signal after the transient, i=1, 2, ... N.

9. The apparatus of claim 1, wherein the compensation processor further comprises a fast gain path circuit configured to receive the error signal and generate an amplified voltage error signal.

10. The apparatus of claim 9, wherein the fast gain path circuit further comprises a low-pass filter configured to filter the error signal, and an amplifying circuit configured to amplify the filtered error signal.

11. The apparatus of claim 10, wherein the amplifying circuit further comprises a first selection circuit configured to enable or disable the fast gain path circuit.

12. The apparatus of claim 11, wherein the amplifying circuit further comprises an amplifier configured to amplify the filtered error signal with a first gain value when the voltage error signal is positive and amplify the voltage error signal with a second gain value when the voltage error signal is negative.

13. The apparatus of claim 12, wherein the first gain value is different from the second gain value.

14. A method of configuring a quantum charge modulator, comprising:
   generating, by a feedback error compensator, a first compensation signal in response to an error signal associated with a controlled circuit parameter of a digital feedback system;
   generating, by a compensation processor, a second compensation signal to compensate the error signal by performing operations to maintain an average switching frequency over a predetermined number of N cycles in response to a transient; and,
   combining the first compensation signal and the second compensation signal to generate a control signal to be received by the digital feedback system, wherein a period of a measured pulse modulated signal output by the digital feedback system is responsive to the generated control signal,
   wherein, the second compensation signal is a function of a calculated phase deviation $\Delta_{calc}$, the calculated phase deviation $\Delta_{calc}$ is a function of a real phase deviation $\Delta T_{SW}$ between a stable pulse modulated signal having a cycle period $T_{SW}$ before the transient and the measured pulse modulated signal having a cycle period $T_{SW\_M}$ after the transient.

15. The method of claim 14, wherein performing operations further comprise:
   (a) determining the real phase deviation $\Delta T_{SW}$;
   (b) if the $\Delta T_{SW}$ is less than or equal to a predetermined threshold THR1, then updating the $\Delta_{calc}=0$; and,
   (c) if the $\Delta T_{SW}$ is greater than the THR1, then for a first predetermined number of cycles NC1, updating the $\Delta_{calc}$ by adding the $\Delta T_{SW}$.

16. The method of claim 15, wherein performing operations further comprise:
   (d) if the $\Delta T_{SW}$ is greater than the THR1 after the first predetermined number of cycles NC1, then for a second predetermined number of cycles NC2, updating the $\Delta_{calc}$ by multiplying a user-predetermined forgetting factor; and,
   (e) if the $\Delta T_{SW}$ is less than or equal to THR1 after the first predetermined number of cycles NC1, then repeating operations (a)-(d) for the NC1 cycles.

17. The method of claim 16, wherein when the second predetermined number of cycles NC2 further comprises a plurality of sub cycles, in each sub cycle of the plurality of sub cycles, updating, by the compensation processor, the $\Delta$calc to associate with a corresponding forgetting factor.

18. The method of claim 16, wherein performing operations further comprise:
   (f) if the absolute value of $\Delta_{calc}$ is greater than the THR1 after the cycles NC2, then for a third predetermined number of cycles NC3, updating the $\Delta_{calc}=0$; and,
   (g) if the absolute value of $\Delta_{calc}$ is less than or equal to THR1 after the NC2 cycles, then repeating operations (a)-(d) for the NC1 cycles.

19. The method of claim 16, wherein the compensation processor comprises an error calculation circuit configured to calculate the $\Delta_{calc}$ in response to the error signal, the stable pulse modulated signal having a cycle period $T_{SW}$, and the measured pulse modulated signal having a cycle period $T_{SW\_M}$.

20. The method of claim 14, wherein the phase deviation $\Delta T_{SW}=\Sigma\Delta_i$, $\Delta_i=\Delta_{i-1}+(T_{SW}-T_{SW\_Mi})$, i is the $i^{th}$ pulse of the measured pulse modulated signal after the transient, i=1, 2, . . . N.

* * * * *